(No Model.)  3 Sheets—Sheet 1.

R. A. GIBSON.
MACHINE FOR TURNING BICYCLE MUD GUARDS, RIMS, &c.

No. 554,925. Patented Feb. 18, 1896.

Witnesses,
Emil Neuhart
L. M. Spong.

Robert A. Gibson, Inventor
By James Sangster, Attorney.

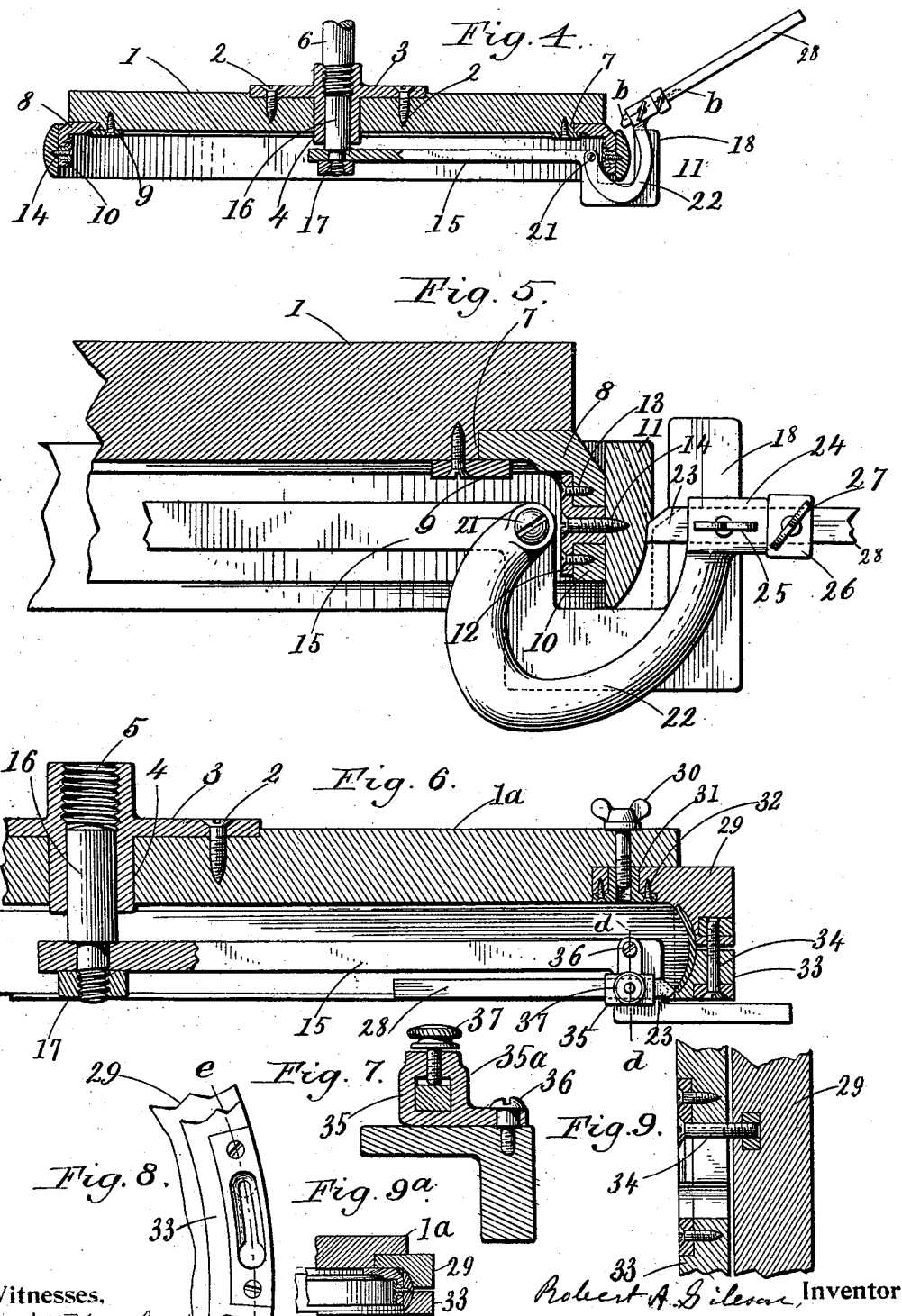

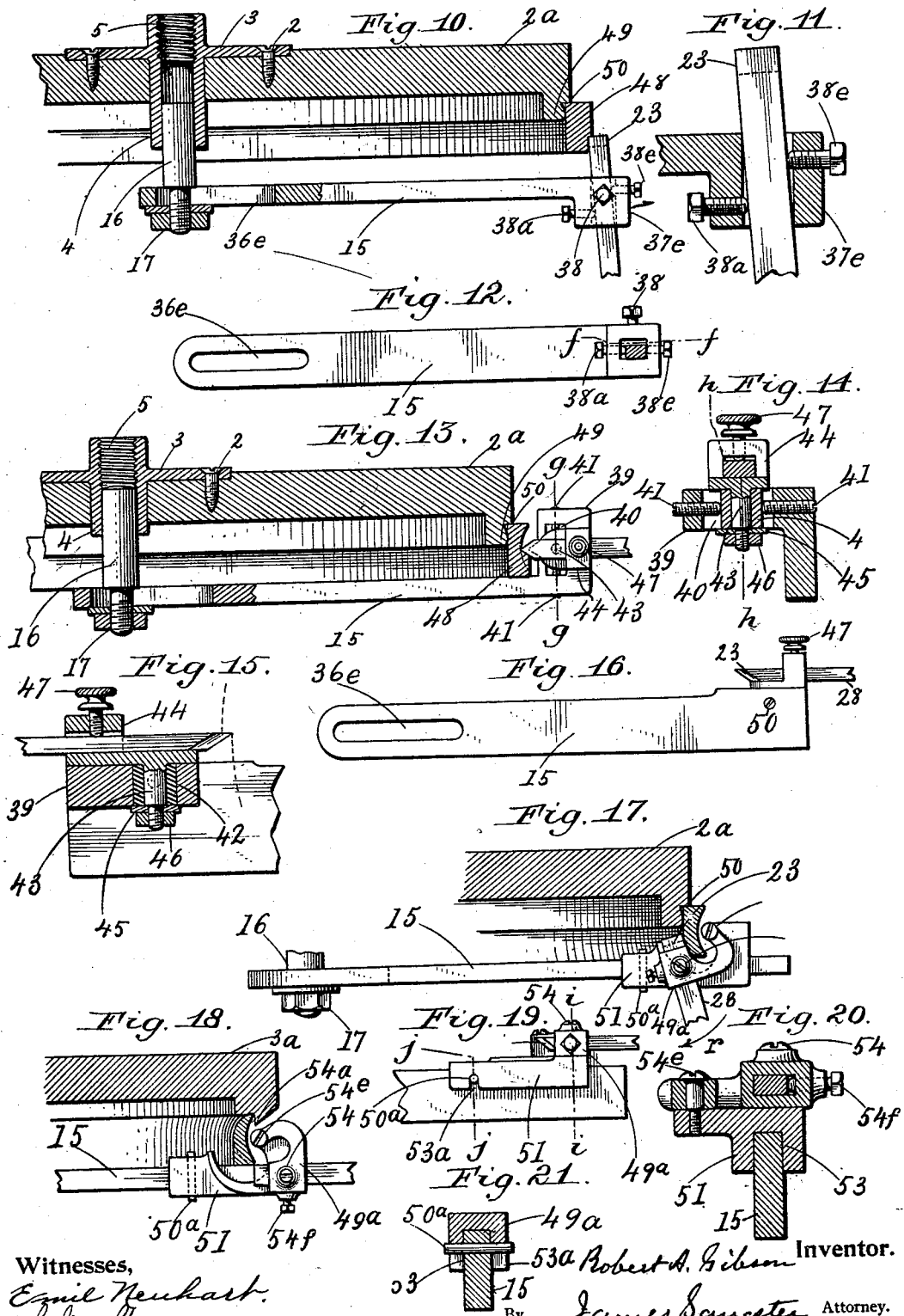

United States Patent Office.

ROBERT A. GIBSON, OF BUFFALO, NEW YORK.

MACHINE FOR TURNING BICYCLE MUD-GUARDS, RIMS, &c.

SPECIFICATION forming part of Letters Patent No. 554,925, dated February 18, 1896.

Application filed November 29, 1895. Serial No. 570,353. (No model.)

*To all whom it may concern:*

Be it known that I, ROBERT A. GIBSON, a citizen of the United States, residing at Buffalo, in the county of Erie and State of New York, have invented certain new and useful Improvements in Machines for Turning Bicycle Mud-Guards, Rims, or other Similar Articles, of which the following is a specification.

The object of my invention is to provide a simple and reliable machine for turning bicycle mud-guards, bicycle-rims, or other similar articles, and it will be fully and clearly hereinafter described and claimed, reference being had to the accompanying drawings, in which—

Figure 1:
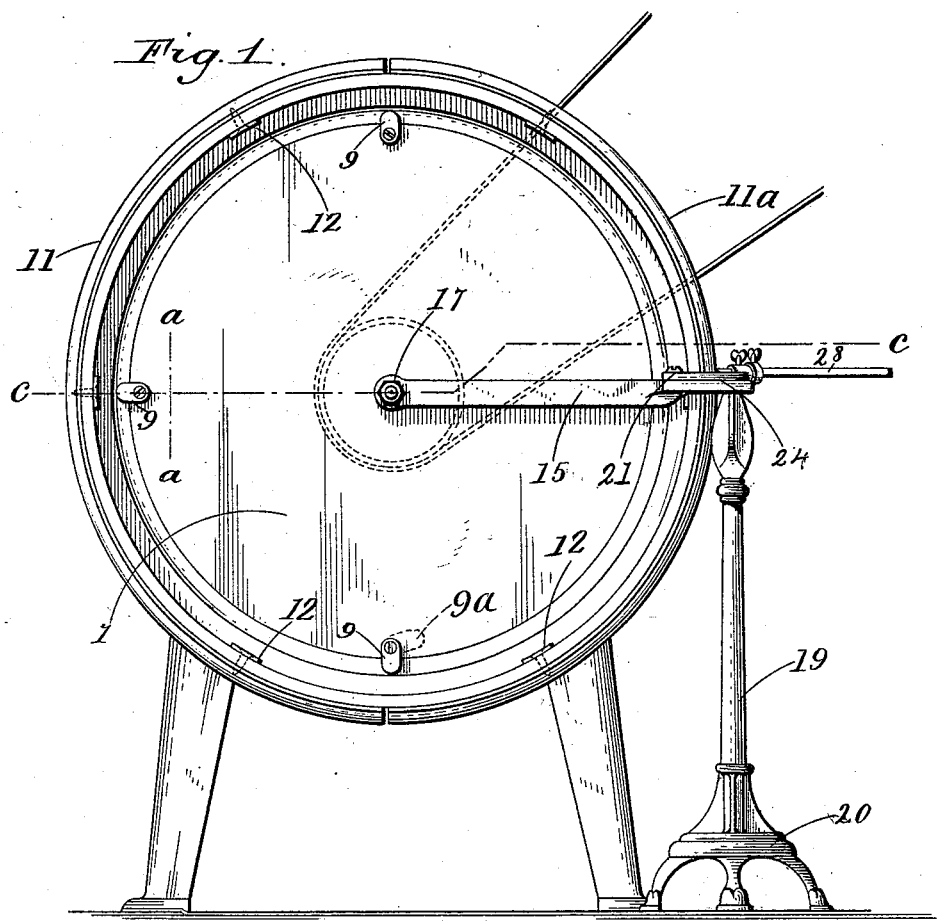
Figure 2:
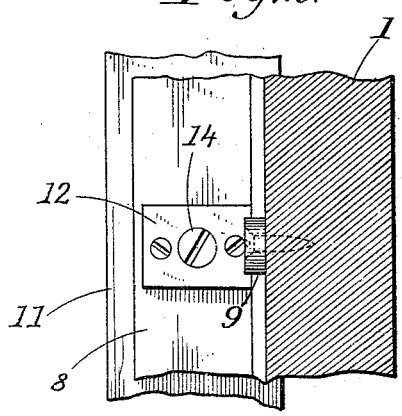
Figure 3:
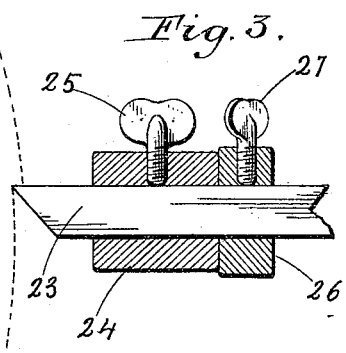

Figure 1 represents a front end elevation of a lathe, showing the wooden chuck and a pair of mud-guards secured thereon, showing also a side elevation of the tool in position for operating. Fig. 2 is a section on or about line $a\,a$, Fig. 1, showing one of the fastening devices for securing the mud-guard to the chuck in position to be turned on the outside. Fig. 3 is a vertical section on or about line $b\,b$, Fig. 4, showing the device for securing and adjusting the cutting-tool, the cutting-bar being shown in elevation. Fig. 4 is a horizontal section on or about line $c\,c$, Fig. 1, cutting through the chuck, showing a top elevation of the tool for cutting the outer side of the mud-guard and the manner in which it is attached to the chuck. Fig. 5 represents a horizontal section similar to that shown in Fig. 4, cutting through a portion of the chuck only and showing an enlarged top view of the tool in cutting position for cutting the outside. Fig. 6 is a similar section cutting through a portion of the chuck and showing a top plan view of the tool for cutting the inside of the mud-guard. Fig. 7 is a vertical section on line $d\,d$, Fig. 6, cutting through the cutting bar and holder and showing the pivotal pin on which the holder turns and the thumb-screw for securing the cutting-tool. Fig. 8 represents a front view of a portion of the clamping-rim, showing the device for holding the rim in place. Fig. 9 represents a section on line $e\,e$, Fig. 8, cutting through the clamping-rim and chuck. Fig. 9ª is a sectional elevation showing the manner of securing the mud-guards to the chuck preparatory to turning their inner sides. Fig. 10 is a central horizontal section through a portion of the chuck, showing a top plan view of the trimming-tool. Fig. 11 is a vertical section on or about line $f\,f$, Fig. 12, through the trimming-tool holder, showing the manner of adjusting the cutting-bar and holding it. Fig. 12 is a front elevation of the supporting-arm and trimming cutting-bar holder. Fig. 13 is a central horizontal section through the chuck, showing a top view of the supporting-arm and cutting-tool for turning the outside of the rim. Fig. 14 represents a vertical section on or about line $g\,g$, Fig. 13, showing the manner of holding and adjusting and pivoting the cutting-bar. Fig. 15 is a vertical section on or about line $h\,h$, Fig. 14, showing the manner of holding and pivoting the cutting-bar. Fig. 16 is a front elevation of the cutting-bar holder. Fig. 17 represents a top plan view of the cutting-tool for cutting the inside of the rim, a section being shown through a portion of the chuck to which the rim is removably attached. Fig. 18 is a similar view of the tool, showing the manner of securing the rim for cutting the last half of the inner side. Fig. 19 represents a front view of the outer end of the cutting-tool. Fig. 20 represents a vertical section on or about line $i\,i$, Fig. 19, showing the manner of adjusting, pivoting, and holding the cutting-bar. Fig. 21 represents a vertical section on or about line $j\,j$, Fig. 19, showing the manner of securing the cutting-bar frame and preventing it moving endwise.

Referring to the drawings in detail, 1 represents a wooden chuck secured by screws 2 to a face-plate 3. (See Figs. 1, 4, and 6.)

The face-plate 3 is provided with a forwardly-extending tubular portion 4, preferably made in one integral piece with it. The object of the tubular portion 4, which is turned out true on the inside, will appear farther on.

The back of the face-plate 3 is provided with the usual internal screw-threaded portion 5, (shown in Fig. 6,) by which it is removably secured to the lathe-spindle 6. (See Fig. 4.)

The wooden chuck 1 (see Figs. 1 and 4) is secured in its place and is made with a depression surrounding its periphery, thereby forming the reduced portion 7, over which is fitted a rim 8. This rim 8 is secured in place to the chuck by the pivoted buttons 9, (see Figs. 1, 2, and 5,) so that it can be easily removed by turning the extended portion of the buttons off from it, as shown by the dotted lines 9ª in Fig. 1. On the rim 8 is an outward-extending rim portion 10, on which two mud-guards 11 and 11ª are secured to be turned. (See Fig. 1.)

The inner sides of the rim portion 10 are provided with a series of metal plates 12, rigidly secured thereto by screws 13. In or about the center of these metal plates is a screw 14, which passes into and secures the mud-guards 11 and 11ª rigidly to the rim portion, substantially as shown in Figs. 1 and 5, to be turned on the outside. I have shown six of the metal plates 12; but there may be more or less than the number shown.

The tool for turning the outside of the mud-guards is constructed as follows: Referring to Figs. 1, 4, and 5, 15 represents a metal supporting bar or arm, having at one end a round bar 16, rigidly secured at right angles to it by a nut 17. This round bar is truly turned and is adapted to fit nicely in the tubular portion 4 so it can be moved by the hand easily in or out therefrom. At the opposite end of the arm 15 is an angular portion 18, which is flat on the under side, so it can rest and move horizontally on the top of the standard 19, which is supported by a base or tripod 20. (See Fig. 1.) On this arm is pivoted by a pivotal pin 21 a curved cutter-bar holder 22. (See Figs. 4 and 5.) The cutter-bar 23 passes through the holding portion 24, and is tightened in place by a thumb-screw 25. On the cutter-bar is a holding portion 26, through which the cutter-bar slides easily. It is also provided with a thumb-screw 27, so that it may be rigidly secured to the cutter-bar. Its object is to prevent the cutter-bar from being slipped in too far when securing it in the holding portion 24.

The operation of this part of the device while turning the outside of the mud-guards will be easily understood by reference to Figs. 1, 4, and 5. The pivotal point 21, being the center of a circle, of which the curved form (in cross section) of the finished mud-guard forms a portion and the center bar being directly in a line with a line radiating from the center of said circle, all that is necessary to do is to take hold of the handle end 28 of the cutter-bar and turn it in the arc of a circle while the mud-guards are turning at the usual high speed in the lathe, and they will be turned substantially as shown in Figs. 5 and 4.

The slightly-modified construction of the device is shown in Figs 6, 7, 8, 9, and 9ª, another chuck 1ª being secured to a face-plate 3 in a similar manner. (See Fig. 6.) The chuck 1ª is also provided with a depression around its periphery, in which is fitted a rim 29. It is secured to the chuck by a series of thumb-screws 30, each one of which passes through the chuck from the back into a metal plate 31, secured to the rim 29 by screws 32. (See Fig. 6.) The mud-guards after having been turned on the outside are easily removed from the rim 8 (the arm 15 being first removed) by turning the buttons 9 to the position shown at 9ª in Fig. 1, and then removing the rim 8 with the mud-guards on, then setting the whole into the rim 29 and placing a rim 33 over the mud-guards and securing it rigidly in place by screws 34, of which there is a series around the rim 33. The mud-guards being now secured in position within its holding-chuck the rim 8, to which they were secured for turning the outside, is easily removed by taking out or turning the screws 14 out far enough to release it from the mud-guards. The cylindrical portion of the arm 15 is then again slipped into the tubular portion 4 of the face-plate, and the opposite end of the arm is then allowed to rest on the top of the standard 19 as before when turning the outside of the mud-guards.

A cutter-bar holder 35 is pivoted to the bar 15 by a pivotal pin 36. (See Fig. 6.) The cutter-bar holder is provided with a sleeve 35ª, through which the cutter-bar 23 is passed, as shown in Figs. 6 and 7, and secured at any point to which it may be adjusted by means of a thumb-screw 37.

From the above construction it will be seen that all that is required now to turn the inside of the mud-guards concave, as shown in Fig. 6, is to move the handle end 28 of the cutter-bar outward, which operation will cause the cutting end to move inward in the arc of a circle of which the pivotal pin 36 is the center, and the mud-guard will be completed substantially as shown in said Fig. 6. The completed mud-guards are now removed and others put in their place to be turned.

In adapting the tool to turn a bicycle-wheel rim the free end of the arm 15 is slightly modified to adapt the cutter-bar for trimming the rim, also for cutting the concave outer side and the convex inner side of the rim, as will appear farther on.

Referring to the figures on the last sheet of drawings, Sheet 3, 2ª represents another wooden chuck. It is also secured by screws to the face-plate 3. The arm 15 in this instance is provided with a slot 36ᶜ. (See Figs. 12 and 16.) This construction allows the cylindrical portion 16 to be adjusted in a longitudinal direction on the arm 15 and then rigidly secured by the nut 17. The office of the cylindrical portion 16 is the same in this instance as before—that is, to allow the arm 15 and its turning-tool to be moved to or from the face of the chuck while being kept parallel with it by the cylindrical portion 16, which fits nicely in the tubular portion 4 of the face-plate. The object of the slot 36ᶜ is to adapt the tool for different-sized rims.

When using the tool for trimming a rim 48, as in Fig. 10, the supporting-arm 15 in this instance is provided with a cutter-bar-holding portion 37ᶜ made integral with it and having three set-screws 38, 38ª and 38ᶜ, the set-screw 38 for securing the cutter-bar at any point to which it may be adjusted and the set-screws 38ª and 38ᵉ for adjusting the inclination of the cutter-bar, substantially as shown in Fig. 11. The lower side of the cutter-bar holder is made substantially horizontal and flat and rests on the top of the standard 19. (Shown in Fig. 1.)

From the above it will be seen that by pushing the arm 15 forward the cylindrical portion 16 will pass into the tubular portion 4 and hold that end of the arm 15 in position, and that the end of the cutter 23, at the opposite end of said arm, will move in a straight line over the rim and thereby trim it while the lathe is running in the usual manner.

The modified construction of the cutter-holding end of the arm 15 for cutting the concave outside portion of the rim is shown in Figs. 13, 14, 15, and 16. The cutter-bar arm 15 is the same, and carries a similar cylindrical portion 16, adapted to be moved in and out of the tubular portion 4.

At the forward end of the arm 15 is a side inward-extending cutter-holder-frame portion 39 having a vertical opening 40 through it, (see Figs. 13 and 14,) and at each opposite end of the opening is a countersunk-head set-screw 41. A box 42 is adapted to fit nicely in the opening 40, so as to slide longitudinally back and forth therein. In this box 42 is pivoted by a pivotal pin 43 the cutter-bar holder 44, the pin 43 extending down from or forming an integral part of the cutter-bar holder 44. At the lower end of the pin 43 is a screw portion provided with a nut and washer 45 46, (see Figs. 14 and 15,) which secures said pin and its cutter-bar holder removably to the block 42 and to the side extending portion 39, so that while the parts fit nicely the cutter-bar holder and its pivotal pin can be turned easily therein.

The cutter-bar holder is provided with a horizontal opening through it adapted to allow a cutter-bar 23 to pass through it and be secured by a set-screw 47.

The object of the set-screws 41 is to provide the means for adjusting the cutter-bar pivotal center 43 to the center of the width of the rim to be turned.

From the construction above described it is evident that if the several parts be placed in the position shown in Fig. 13, with the portion 16 in the tubular portion 4 and the opposite end of the arm 15 supported on the top of a standard 19, that the concave outer side of the rim 48 will be turned (while the lathe is in action) by turning the cutter-bar on its pivotal center 43.

The rim 48 is secured to the chuck 2ª by being forced over the portion 49 until it touches the shoulder 50, and is thereby held with sufficient force for turning it.

The modified construction for turning the inner convex side of the rim 48 is shown in Figs. 17, 18, 19, 20, and 21. The arm 15, carrying the cutter-holder frame 39 and cutting mechanism, is removed and another similar arm provided with a cutter-holder 49ª put in its place, its forward end portion resting on the top of the standard 19 and its rear end carrying the cylindrical portion 16, put in place within the tubular portion 4, as before. Near the forward end of the bar 15 is a transverse pin 50ª rigidly secured in place so as to extend outward each side of the arm.

The base or support 51, upon which is mounted the cutter-bar holder 49ª, is provided on its under side with a groove or slot 53. (See Figs. 20 and 21). Each side portion forming the groove or slot 53 is provided with a transverse slot or opening 53ª, (see Fig. 19,) which fits over the end portions of the cross bar or pin 50 that project through the arm 15 each way, substantially as shown in said Fig. 19, (see, also, Fig. 21,) and thereby prevent said base from moving longitudinally along the arm 15, so that when set in place it is immovable either transversely or longitudinally. On the top of the base portion 51 is pivoted by a pin 54 the cutter-bar holder 49ª. Through the cutter-bar holder is an opening through which the cutter-bar 23 is adapted to pass easily, and when adjusted to the proper point it is secured rigidly in place by means of the thumb-screw 56. It will be noticed that the pivotal center of the cutter-bar holder 49ª is the same as the other cutter-bar holders—that is, within a central line drawn longitudinally through the rim to be turned.

From the above construction it will be seen that by turning the cutter-bar (while the lathe is in operation) in the direction of the arrow $r$ in Fig. 17, one half, the first half, of the inner side of the rim will be turned. The rim 48 is now removed from the chuck 2ª and reversed and put into a chuck 3ª, which is provided with a projecting surrounding rim 54ª, in which the rim is forced, substantially as shown in Fig. 18. The same cutter-bar and mechanism is then put back in place again as before. The lathe now being again put in motion the cutter-bar is again turned on its pivotal center in the same direction, and thereby completes the turning of the rim.

I claim as my invention—

1. In a machine for turning bicycle or other rims, the combination with a lathe carrying a face-plate having a forward-extending tubular portion, of a supporting-arm, a cylindrical bar adapted to fit said tubular extension and secured at or near one end of the supporting-arm and at right angles thereto, a pivoted cutter-bar holder at the opposite end of the supporting-arm carrying a cutting-bar, means for adjusting and securing the cutting-bar to the cutter-holder, and a standard upon which the supporting-arm rests, substantially as described.

2. In a machine for turning bicycle or other rims, a cutter-bar-supporting arm having at one end a cylindrical bar adapted to fit a tubular portion extending from the lathe face-plate, to keep the supporting-arm parallel therewith while it is free to be moved toward or from the face-plate, and carrying at its opposite end the cutting mechanism, substantially as described.

3. In a machine for turning bicycle or other rims, the combination with a lathe provided with a face-plate having a forward tubular extension, of a supporting-arm having at one end a cylindrical bar extending at right angles from the side and adapted to fit and move in said tubular extension, cutting mechanism mounted at the opposite end of the supporting-bar, and means for supporting the same, substantially as described.

4. In a machine for turning bicycle or other rims, the combination with a lathe carrying a face-plate having a forward tubular extension, of a supporting-arm provided with a cylindrical bar connected at right angles thereto and adapted to fit the tubular extension, means for adjusting the cylindrical bar longitudinally on the supporting-arm and securing it thereto, cutting mechanism mounted on the opposite end of the supporting-arm, and means for supporting and operating the cutting mechanism, substantially as described.

ROBERT A. GIBSON.

Witnesses:
JAMES SANGSTER,
L. M. SPONG.